United States Patent Office 3,654,369
Patented Apr. 4, 1972

3,654,369
FLUORINATION PROCESS FOR PREPARING CERTAIN DIFLUORAMINO COMPOUNDS
Donald L. Esmay, Coon Rapids, Minn., assignor to Minnesota Mining and Manufacturing Company, St. Paul, Minn.
No Drawing. Continuation-in-part of application Ser. No. 531,629, Feb. 21, 1966. This application Sept. 11, 1967, Ser. No. 668,293
Int. Cl. C07c 87/22
U.S. Cl. 260—583 NH        8 Claims

ABSTRACT OF THE DISCLOSURE

Fluorination process especially adapted for the production of highly fluorinated oxidant compounds comprising the steps of forming an adduct between ammonia and a substituted fluorimino compound in solution in an inert solvent at relatively low temperatures, removing substantially all of the solvent, then adding to the reaction mixture an inert fluorocarbon solvent, followed by direct fluorination by contacting the adduct-solvent mixture with fluorine at a temperature less than 0° C. The process produces improved yields in larger scale reactions.

RELATION TO OTHER APPLICATIONS

This application is a continuation-in-part of prior copending application Ser. No. 531,629, filed Feb. 21, 1966, now abandoned.

BACKGROUND OF THE INVENTION (1) Field of the invention

This invention relates to processes for production of fluorinated compounds.

(2) Description of the prior art

The preparation of highly fluorinated compounds on a small scale is known, but production in larger amounts presents many practical difficulties. As the compounds are very energetic oxidizers, the likelihood of explosions and low yields increases, and becomes more serious as production is scaled up.

SUMMARY OF THE INVENTION

This invention contemplates provision of a process for larger scale production of highly fluorinated oxidant compounds.

In accordance with the present invention, a process is provided for production of highly fluorinated oxidants, and specifically, tetrakis(difluoramino)methane and related compounds, which diminishes difficulties so that pilot plant and/or large scale production is feasible.

The process of the invention involves the production of an adduct between ammonia and a fluorimino compound which is free from reducing substituents, followed by direct fluorination of the adduct to form a compound having increased oxidizing capability.

Noncompatible substituent groups which must not be present in the fluorimino compound are those which are strongly reducing in nature.

A criterion for determining the compatibility of functionally reducing substituents in the fluorimino compound is the single electrode potential of the oxidation-reduction couple of which the substituent in the reduced form is measured against a normal hydrogen electrode. Using this convention, the single electrode potential of the iodide to iodine couple is −0.53 volt. Compatible substituents of this type include those which have measured or calculated potentials more negative than −0.6 volt, under the conditions in which the fluorimino group-containing compounds are manipulated. On the other hand, substituents of this type which would normally have a potential less negative than −0.6 volt (say up to +0.5 volt or even higher) will be compatible in the process of the invention when the temperature of preparation, or the solvent used; or the physical state of the final product, are such that the kinetics of decomposition control the rate to an acceptable degree.

Illustrative of these strongly reducing groups are those which contain reactive metal to carbon and metal to hydrogen bonds; pi-bonded metallo-organic moieties; ionically bonded iodide, sulfide and polysulfide; polyhydroxy groups in aromatic nuclei; and inorganic groups which contain trivalent phosphorous, monovalent copper, or any element above atomic number 22 in a reduced valence state.

Functional groups commonly known to the art which can be present in the starting compounds for the process of this invention can be hydroxy, azo, azoxy, cyanate, amino, imino, cyano, halogeno, tetrazolyl, alkoxy, alkylthio, oxo, nitroso, ureido and the like, as well as oxidizing groups such as nitro, difluoramino, fluorimino, chloramino, peroxy and the like.

Broadly speaking, the process of the invention for the preparation of highly fluorinated oxidant compounds comprises (A) Reacting ammonia and a substituted fluorimine of the formula $$Z'-\overset{Z}{\underset{}{C}}=NF$$

wherein Z is —R$_f$, —OR, —NFR$_f$, —NF$_2$, —CN, —SF$_5$,

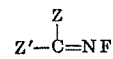

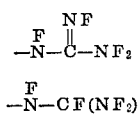

—N=N—C(=NF)NF$_2$, —F, —Br, —Cl or —N$_3$; Z' is —NF$_2$ or —CN; R$_f$ is a highly fluorinated alkyl group having 1 to 8 carbon atoms; and R is an alkyl group having 1 to 8 carbon atoms at a temperature in the range of −120° to 0° C. in an organic solvent which is an inert liquid under the conditions of reaction and which is a solvent or dispersant for both ammonia and the substituted fluorimine to form an adduct of the formula

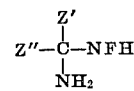

wherein Z' has the significance set out above and Z" is

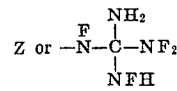

(B) Removing the solvent from the said adduct;
(C) Mixing the said adduct with a fluorocarbon solvent inert towards the adduct and fluorine; and
(D) Contacting the said adduct-solvent mixture with fluorine at a temperature less than 0° C. and above the melting point of the mixture.

The highly fluorinated alkyl groups are characterized by replacement of at least about 80 percent of all of the available hydrogen atoms by fluorine. During the ensuing reaction at least one hydrogen atom bonded to nitrogen in the precursor adduct is replaced by fluorine (step D). The fluorinated products are isolated by known procedures, e.g. chromatography.

The products of the process contain a plurality of fluorinated nitrogen atoms and have increased oxidizing power as compared with the starting materials.

It has been found that improved yields of the desired product are obtained by carrying out step A of the preparation in solution in the organic solvent, removing the organic solvent, then adding an inert fluorocarbon solvent and carrying out the fluorination step. It is preferred to add a scavenger for hydrogen fluoride, e.g. sodium fluoride, to the reaction mixture in the fluorination step, in order to remove the hydrogen fluoride which is formed.

Suitable inert solvents for step A are e.g. lower alkyl ethers in which each radical has from 1 to 3 carbon atoms, dioxane, 2-fluoropyridine, dimethyl formamide, dimethyl acetamide, dimethylsulfoxide, hexafluorodiethyl ether, dimethyl sulfur tetrafluoride and the like. The ethers in particular exhibit good solvent or dispersant properties for the components of the mixture and are easily removed when the reaction is complete, as by fractional distillation.

Inert fluorocarbon solvents useful for the process include perfluorinated ethers, perfluorinated hydrocarbons such as perfluorooctanes, perfluorohexanes and the like; perfluorocyclohexane; perfluorinated cyclic ethers such as perfluorobutylfuran; perfluorinated tertiary amines such as tris(perfluoro-n-butyl)amine; and the like. Commercially obtainable fluorocarbons may contain an amount of material which is not inert toward fluorine. In such cases, fluorine gas is passed through the selected fluorocarbon liquid for a time in small amounts sufficient to render it substantially completely inert toward fluorine.

In carrying out the process, temperatures ranging from about $-120°$ to about $0°$ C. are used in preparing the adduct, $-100°$ to $-10°$ C. being a preferred range, but in any case above the melting point of the solvent. In the fluorination, the temperatures can range from just above the melting point of the solvent mixture to $0°$ C., with fluorination preferably being conducted at about $-40°$ to $-20°$ C. Fluorination is accomplished by use of 5 to 50 percent by weight of fluorine in an inert gas, e.g. nitrogen, argon, helium or the like. The lower concentrations of fluorine require longer exposure time.

DESCRIPTION OF THE INVENTION

The following examples, in which all parts are by weight unless otherwise specified, will more specifically illustrate the process of the invention. Perfluoroguanidine can be prepared by the direct fluorination of dry ammeline with 5 percent fluorine at about $-16°$ C., the products of the process being separated and purified by gas-liquid chromatography using a high-boiling fluorochemical liquid as the stationary phase. A number of other materials suitable for use as starting compounds in the present case are also disclosed in the copending application Ser. No. 425,113, filed Jan. 8, 1965.

EXAMPLE 1

The preparation of tetrakis(difluoramino)methane from perfluoroguanidine takes place in two steps, as follows:

(1)    $(F_2N)_2C=NF + NH_3 \rightarrow (F_2N)_2C(NH_2)NFH$

In this step, ammonia and perfluoroguanidine react to form an adduct.

(2)    $(F_2N)_2C(NH_2)NFH + 3F_2 \rightarrow C(NF_2)_4 + 3HF$

In this step, the adduct from step 1 is fluorinated.

The apparatus used is a conventional stainless steel 300-ml. autoclave equipped with a stirrer, gauges, valves, gas line inlet, thermocouple well, liquid sampling line, gaseous product exit line, and a flush-bottom valve. A suitable fluorine-nitrogen supply system is attached to the gas inlet. The gas exit line is valved so that the effluent gases can be passed through a gas chromatograph for analytical monitoring, or passed through a potassium iodide bubbler (to measure unreacted fluorine or equivalent), or passed through a cold trap to remove condensible products. The entire unit is isolated behind protective shielding during operation.

The reactor is cooled to $-110°$ C. and charged with 106 ml. of dimethyl ether. While stirring at a moderate speed (300 r.p.m.) at $-110°$ C., there is added 0.0733 mole of a gas containing about 60 percent, i.e. 0.044 mole (6.6 g.) of perfluoroguanidine, the remainder being principally tris(difluoramino)fluoromethane, commonly found in the products of direct fluorination of ammeline. The presence of the tris(difluoramino)fluoromethane does not interfere with the process.

A solution is separately prepared containing 0.04 mole of ammonia in 50 ml. of dimethyl ether. While stirring the perfluoroguanidine solution at 22 in. Hg vacuum and $-100°$ C., the ammonia solution is slowly added during 4 minutes. The temperature rises to $-80°$ C. then falls back to $-90°$ C. The temperature is then raised to $-80°$ C. and the solution is sampled for analysis. Gas chromatographic analysis shows that over one-half of the perfluoroguanidine has been converted to the adduct with ammonia.

After standing overnight at $-80°$ C. without stirring, stirring is resumed and the temperature raised to $-60°$ C. The reactor is connected to a trap cooled to $-111°$ C. (trichlorofluoromethane-liquid nitrogen slush bath) and evacuated to 100 mm. Hg pressure, whereupon dimethyl ether condenses into the trap. After about 105 ml. of solvent are collected, the reactor is closed and evacuated. A slow stream of nitrogen in started through the gas inlet system, then a pre-cooled mixture of 152 ml. (270 g.) of perfluorinated eight-carbon cyclic ethers (available under the trademark FC–75) and 10 g. of sodium fluoride is added to the reactor. Removal of the dimethyl ether is continued until no more is removed under full pump vacuum at $-45°$ C.

The reaction mixture is fluorinated, at $-40°$ to $-45°$ C. and 25 p.s.i.g. while stirring rapidly (900 r.p.m.), using a slow flow of a 50:50 volume mixture of fluorine:nitrogen. The initial slow stream of nitrogen is also allowed to continue during the first 70 minutes.

During a total of 100 minutes, 0.12 mole (4.5 g.; 1.0 equivalent) of fluorine is added. About 0.85 g. is thus passed through the reactor as determined by back-titrating the potassium iodide solution in the bubbler with thiosulfate. Sampling of the solution and gas chromatographic analysis show 0.9 g. of tetrakis(difluoramino)methane present at this point. An additional 0.06 mole (0.5 equivalent) of fluorine is added during 55 minutes (about 0.01 mole passes through unreacted). By this time the rate at which fluorine is passing through unreacted is increasing, and the temperature is falling. Gas chromatographic analysis shows the reactor solution to contain 1.3 weight percent (3.3 g.; 38 mole percent yield) of tetrakis-(difluoramino)methane. Rapid distillation yields 5.5 g. of volatile material. This is purified by gas chromatography to yield 1.4 g. (16 mole percent) of highly purified tetrakis(difluoramino)methane.

EXAMPLE 2

The compound of the formula

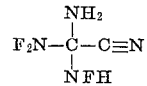

is prepared as follows: A gaseous mixture of 2 millimoles of ammonia and dimethylether (8 millimoles) is gradually added under reduced pressure to a stirred solution of 2 millimoles of perfluorocyanoformamidine,

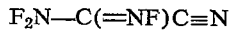

in about 1.5 ml. of liquid dimethylether at $-110°$ C. A 5 ml. borosilicate glass reactor can be used. The resulting mixture is stirred at $-110°$ C. for 1 hour. The dimethyl ether and volatile components are removed at $-63°$ C. under vacuum until the vapor pressure above the residue in the reactor is less than about 2 mm. Hg. To the residue, which contains the desired product mixed with a small amount of dimethyl ether, is added 2.5 cc. of perfluorinated cyclic ether as in Example 1, under vacuum. The mixture is then allowed to warm to about −35° C. until a light yellow solution is formed. The product can be fluorinated without further purification or isolation. Conveniently, the mixture is stored at −78° C. under a dry nitrogen atmosphere.

Fluorination of the fluorocarbon solution of the adduct thus prepared is carried out in a borosilicate glass reactor at about −35° C. Fluorine in concentration of 3-volume percent in nitrogen is passed through the solution at a metered constant rate from a 3.0 liter cylinder. After 6 hours, a total of 28.5 millimoles of fluorine is used. A tube filled with NaF pellets and maintained at 25° C. can be used to remove hydrogen fluoride from the effluent gas. The volatile product (6.3 millimoles) is collected in two glass traps in series which are cooled with liquid oxygen. The progress of the fluorination can be followed by chromatographic analysis of the effluent gas stream. This analytical technique is conveniently used to determine when the fluorination is completed.

The product, which contains a small amount of dimethyl ether, some fluorocarbon solvent and tris(difluoramino)acetonitrile, is allowed to warm gradually to room temperature and is passed under vacuum through a trap cooled to −78° C. followed by a trap cooled with liquid nitrogen. Chromatographic separation of the components of the liquid nitrogen cooled trap (4.4 millimoles), carried out on a 24 ft., ½ inch column composed of 33 percent by weight of the fluorochemical FX–45 on Chromasorb P at 25° C., yields 1.1 millimoles of a mixture of $(F_2N)_3C—C≡N$ ($T_R=287$ with $CFCl_3$ as standard) and a small amount of dimethyl ether. Additional purification is accomplished by using an 18 foot, ½ inch column composed of 33 percent by weight of the fluorochemical Kel-F oil 8126 on Chromasorb P at 25° C. A high purity sample of 0.8 millimole of $(F_2N)_3C—CN$ ($T_R=118$ with $CFCl_3$ as standard) is obtained.

Tris(difluoramino)acetonitrile is a colorless liquid, has a vapor pressure of about 505 millimeters Hg at 23° C. and boils at about 32° C. Its infrared spectrum exhibits an absorption at 4.42 microns due to the —C≡N group and strong absorptions at about 10.3 microns, 10.6 microns and 11.0 microns which are assigned to the $NF_2$ groups. Its fluorine n.m.r. spectrum exhibits a peak at −38.8$\phi$.

EXAMPLE 3

Procedures similar to those described in Example 2 can be used to prepare tetrakis(difluoramino)methane, $C(NF_2)_4$, and other tris(difluoramino)methyl compounds. The adduct, $(F_2N)_2C(NFH)NH_2$, is prepared by the addition of ammonia to perfluoroguanidine using dimethyl ether as solvent. The reaction proceeds rapidly even at −110° C. The dimethyl ether is removed under vacuum until about less than one mm. Hg remains above the residual adduct at −63° C. The adduct (0.02 mole) is then dissolved in 40 ml. of trifluoroethanol, keeping the temperatures below about −25° C. Fluorine in 20 volume percent concentration in nitrogen is passed through the stirred solution of the adduct at about −40° C. for about 5 hours, until 0.30 mole of fluorine has been delivered. The product which collects in traps cooled with liquid air is separated into its various components by gas-liquid chromatography using, for example, an 18 foot, ½ inch column composed of 33 percent by weight of Kel-F oil 8126 on acid-washed Chromasorb P, and operated at room temperature. Tris(difluoramino)fluoromethane and tetrakis(difluoramino)methane are isolated. The retention value ($T_R$) for $C(NF_2)_4$ is 160, using $CFCl_3$ as a reference of 100. Other columns such as a column composed of 20 percent by weight of the fluorine-containing silastic FS–1265 (Dow Corning) on Chromasorb P can be used.

Additional examples for the formation of the compounds of this invention by the fluorination of adducts of ammonia and various trifluoroformamidino compounds are shown in Table I. Thus, for example, the adduct of ammonia and azotrifluoroformamidine $(NF_2C(=NF)—N=N—C(=NF)NF_2)$ yields $(NF_2)_3C—N=N—C(NF_2)_3$ upon fluorination.

TABLE I

| Example | Trifluoroformamidino compound | Ammonia adduct | Tris(difluoramino)-methyl compound |
|---|---|---|---|
| 4 | $CF_3NFC(=NF)NF_2$ | $CF_3NFC(NFH)(NF_2)—NH_2$ | $CF_3NFC(NF_2)_3$. |
| 5 | $ClC(=NF)NF_2$ | $ClC(NFH)(NF_2)—NH_2$ | $ClC(NF_2)_3$. |
| 6 | $CF_3C(=NF)NF_2$ | $CF_3C(NFH)(NF_2)—NH_2$ | $CF_3C(NF_2)_3$. |
| 7 | $CF_3CF_2CF_2C(=NF)NF_2$ | $CF_3CF_2CF_2C(NFH)(NF_2)—NH_2$ | $CF_3CF_2CF_2C(NF_2)_3$. |
| 8 | $BrC(=NF)NF_2$ | $BrC(NFH)(NF_2)—NH_2$ | $BrC—(NF_2)_3$. |
| 9 | $N_3C(=NF)NF_2$ | $N_3C(NFH)(NF_2)—NH_2$ | $N_3C(NF_2)_3$. |
| 10 | $FC(=NF)NF_2$ | $FC(NFH)(NF_2)—NH_2$ | $F—C(NF_2)_3$. |

3,654,369

TABLE I—Continued

| Example | Trifluoroformamidino compound | Ammonia adduct | Tris(difluoramino)-methyl compound |
|---------|------------------------------|----------------|-----------------------------------|
| 11 | $C_2H_5O\overset{NF}{\underset{\|}{C}}-NF_2$ | $C_2H_5O\underset{NH_2}{\overset{NFH}{\underset{\|}{C}}}-NF_2$ | $C_2H_5OC-(NF_2)_3$. |
| 12 | $CF_3NFC(=NF)NF_2$ | $CF_3NF\underset{NH_2}{\overset{NFH}{\underset{\|}{C}}}-NF_2$ | $CF_3NFC(NF_2)_3$. |
| 13 | $NF_2-\overset{NF}{\underset{\|}{C}}-NF-\overset{NF}{\underset{\|}{C}}-NF_2$ | $NF_2\underset{NH_2}{\overset{NFH}{\underset{\|}{C}}}-NF-\underset{NH_2}{\overset{NFH}{\underset{\|}{C}}}-NF_2$ | $(NF_2)_3C-NF-C(NF_2)_3$. |
| 14 | $F_2NC(=NF)NF_2$ | $F_2N\underset{NH_2}{\overset{NFH}{\underset{\|}{C}}}-NF_2$ | $HNFC(NF_2)_3$ and $H_2NC(NF_2)_3$. |

The starting materials and adducts formed in the first step of the process, and the products, e.g. tetrakis(difluoramino)methane, are highly energetic, explosive, impact-sensitive materials. Consequently, precautions to safeguard against dangerous explosions such as protective clothing and the use of shields and barricades must be observed during handling of these materials and while carrying out the preparations.

The highly fluorinated oxidant products of the process of the invention are useful as ingredients in rocket propellent motors.

What is claimed is:

1. The process for the preparation of highly fluorinated oxidant compounds which comprises
   (A) reacting in solution in an inert organic solvent having a melting point between about —120° C. and 0° C. ammonia and a substituted fluorimine of the formula

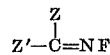

wherein Z is —$R_f$, —OR, —$NFR_f$, —$NF_2$, —CN, —$SF_5$, —$N_3$, —F, —Br, —Cl,

—N=N—C(=NF)NF_2,

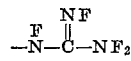

or —N—CF(NF_2)_2; Z' is —NF_2 or —CN; $R_f$ is a highly fluorinated alkyl group having 1 to 8 carbon atoms; and R is an alkyl group having 1 to 8 carbon atoms at a temperature below 0° C. and above the melting point of the solvent to form an adduct of the formula

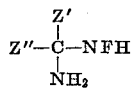

wherein Z' has the significance set out above and Z'' is

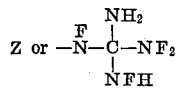

(B) removing most of the inert organic solvent;
   (C) adding to the remaining adduct a fluorocarbon solvent inert towards the adduct and fluorine;
   (D) contacting the said adduct-solvent mixture with fluorine at a temperature less than 0° C. and above the melting point of the mixture; and
   (E) isolating fluorinated oxidant from the reaction mixture.

2. The process according to claim 1, in which the inert organic solvent is a lower dialkyl ether.

3. The process for producing tetrakis(difluoramino) methane which comprises
   (A) forming an adduct by bringing together ammonia and perfluoroguanidine in a solvent of the group consisting of lower dialkyl ethers at a temperature below about 0° C.;
   (B) removing the solvent from the said adduct;
   (C) mixing the said adduct with a solvent inert towards the adduct and fluorine;
   (D) contacting the said adduct-solvent mixture with fluorine at a temperature below about 0° C.; and
   (E) isolating fluorinated oxidant from the reaction mixture.

4. The process according to claim 3, in which the dialkyl ether is a lower dialkyl ether, the alkyl radicals of which each have from 1 to 3 carbon atoms.

5. The process according to claim 3, in which the ether is dimethyl ether.

6. The process according to claim 3, in which the inert solvent is fluorocarbon.

7. The process according to claim 3, in which the temperature of adduct formation is in the range of about —100° C. to —10° C. and the temperature of fluorination is in the range of about —40° C. to —20° C.

8. The process according to claim 3, in which the mixture which is fluorinated contains a scavenger for hydrogen fluoride.

References Cited

UNITED STATES PATENTS

| 3,215,709 | 11/1965 | Logothetis | 260—349 |
| 3,337,605 | 8/1967 | Sausen | 260—465.5 |
| 3,347,829 | 10/1967 | MacDonald | 260—64 |
| 3,354,011 | 11/1967 | Kroon et al. | 149—22 |
| 3,367,968 | 2/1968 | Hoekstra | 260—564 |
| 3,387,033 | 6/1968 | Talbott et al. | 260—583 |

OTHER REFERENCES

Mitsch, J. Am. Chem. Soc., vol. 87, pp. 328 to 333 (1965).

LELAND A. SEBASTIAN, Primary Examiner

U.S. Cl. X.R.

149—109; 260—349, 465.5 R, 564 R, 584 C, 585 R